US008588149B2

(12) United States Patent
Sukiasyan et al.

(10) Patent No.: US 8,588,149 B2
(45) Date of Patent: Nov. 19, 2013

(54) SYSTEM AND METHOD FOR ADJUSTING CHANNELS IN WIRELESS COMMUNICATION

(75) Inventors: Aram Sukiasyan, Calgary (CA); Claude E. Bedard, Carstairs (CA)

(73) Assignee: Fujitsu Semiconductor Limited, Yokohama-shi (JP)

( * ) Notice: Subject to any disclaimer, the term of this patent is extended or adjusted under 35 U.S.C. 154(b) by 640 days.

(21) Appl. No.: 12/483,380

(22) Filed: Jun. 12, 2009

(65) Prior Publication Data

US 2010/0316003 A1    Dec. 16, 2010

(51) Int. Cl.
*H04W 4/00*    (2009.01)

(52) U.S. Cl.
USPC ............................................. 370/329

(58) Field of Classification Search
USPC ........................................ 370/329, 322, 332
See application file for complete search history.

(56) References Cited

U.S. PATENT DOCUMENTS

| 6,487,403 | B2 * | 11/2002 | Carroll | 455/419 |
| 2007/0087772 | A1 * | 4/2007 | Yi et al. | 455/522 |
| 2009/0036159 | A1 * | 2/2009 | Chen | 455/556.1 |
| 2010/0316155 | A1 * | 12/2010 | Reinhold | 375/267 |

OTHER PUBLICATIONS

IEEE WirelessMAN® 802.16, IEEE Standard for Local and metropolitan area networks, Part 16: Air Interface for Fixed Broadband Wireless Access Systems, IEEE Std 802.16™ -2004, (Revision of IEEE Std 802.16-2001), Title Page, Introduction, Notice to Users, Patents, Participants, Contents, List of Figures, List of Tables (pp. i-xxxvi), Chapter 1—Overview (pp. 1-4), Chapter 8—PHY (pp. 307-632), Jun. 24, 2004.

* cited by examiner

*Primary Examiner* — Mark Rinehart
*Assistant Examiner* — Mohammad Anwar
(74) *Attorney, Agent, or Firm* — Baker Botts L.L.P.

(57) ABSTRACT

According to one embodiment, a method for wireless communication includes performing a first scan of a plurality of wireless channels of a wireless communication network by simultaneously utilizing at least two radios of a base station. The method also includes determining a channel quality metric for at least two of the wireless channels in response to the first scan. The method further includes selecting a first wireless channel of the plurality of wireless channels in response to determining the channel quality metrics. In addition, the method includes communicating on the first wireless channel utilizing the at least two radios of the base station.

28 Claims, 3 Drawing Sheets

SYSTEM AND METHOD FOR ADJUSTING CHANNELS IN WIRELESS COMMUNICATION

TECHNICAL FIELD OF THE INVENTION

This invention relates generally to wireless communication and more particularly to a system and method for adjusting channels in wireless communication.

BACKGROUND OF THE INVENTION

Wireless communication systems have suffered from problems of interference. Establishing communication channels that remain resilient in their quality of service has been problematic and complicated. Technically experienced operators have been needed to adjust and/or calibrate a wireless communication device in order to establish adequately-performing communication sessions. This is both time consuming and expensive. A previous solution involves using a centralized controller to choose the wireless channels for the devices communicating on the wireless network. This suffers from a lack of robustness and is inefficient.

SUMMARY OF THE INVENTION

According to one embodiment, a method for wireless communication includes performing a first scan of a plurality of wireless channels of a wireless communication network by simultaneously utilizing at least two radios of a base station. The method also includes determining a channel quality metric for at least two of the wireless channels in response to the first scan. The method further includes selecting a first wireless channel of the plurality of wireless channels in response to determining the channel quality metrics. In addition, the method includes communicating on the first wireless channel utilizing the at least two radios of the base station.

Communicating on the first wireless channel utilizing the at least two radios may include communicating with a mobile station. Such communication may also be performed in a multiple-in-multiple-out mode. The method may further include establishing a communication session with a network access device. The network access device may provide access to a wired communication network. The method may also include receiving information for provisioning the plurality of wireless channels from the wired communication network.

According to one embodiment, a system for wireless communication includes at least two radios. The system is operable to stop a first radio of the at least two radios from communicating on a first wireless channel of a plurality of wireless channels of a wireless communication network. The system is also operable to perform a first scan of the plurality of wireless channels utilizing the first radio. Further, the system determines a channel quality metric for at least one of the wireless channels in response to the first scan. The system also includes a processor. The processor is operable to select a second wireless channel of the plurality of wireless channels in response to determining the channel quality metric for the at least one wireless channel. The processor is also operable to direct the at least two radios to communicate on the second wireless channel.

Depending on the specific features implemented, particular embodiments may exhibit some, none, or all of the following technical advantages. Determining a channel on which to communicate may be performed with reduced assistance by operators. Also, the time it takes to determine a channel on which to communicate may be reduced. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION OF THE INVENTION

Figure 1:
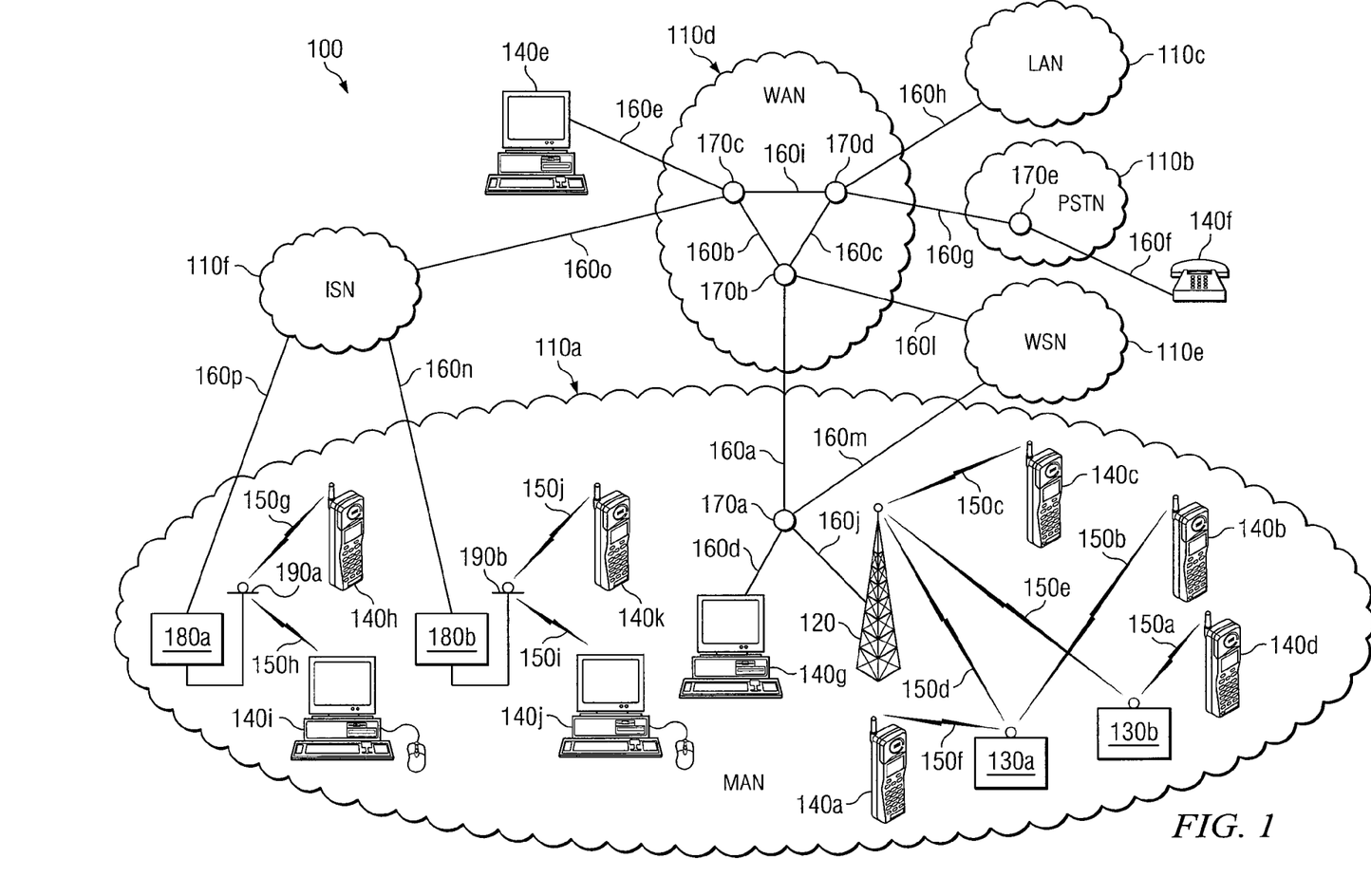
FIG. 1 illustrates one embodiment of a communication system comprising various communication networks.

FIG. 1 illustrates a communication system comprising various communication networks, in accordance with a particular embodiment. Communication system 100 may be comprised of multiple networks 110. Each network 110 may be any of a variety of communication networks comprising any of a variety of communication protocols designed to support one or more different services either independently or in conjunction with other networks and/or communications protocols. For example, networks 110 may facilitate network and/or Internet access via wired or wireless connections (e.g., a WiMAX service). The network access may allow for online gaming, file sharing, peer-to-peer file sharing (P2P), voice over Internet protocol (VoIP) calls, video over IP calls, or any other type of functionality typically provided by a network. In particular embodiments, one or more of networks 110 may comprise an 802.16 based wireless network, popularly known as WiMAX, which may include macro base stations (mBSs), such as mBS 120, relay stations (RSs), such as RSs 130, and femto base stations (fBSs), such as fBSs 190.

For simplicity and ease of discussion, the remainder of this description may use a simplified nomenclature for the various entities that may be involved. 'Owner' may refer to the entity that has purchased an fBS or to whom the fBS is registered. 'User' may refer to the entity to whom a wireless service is being provided. 'Internet service' may refer to the service that the owner uses to access external networks, such as the Internet. While the term 'Internet' is used, it is used for simplicity and is not intended to be limited to only the Internet but includes any type of network, including public and private networks, that the fBS may use to establish its backhaul connection. 'Internet service provider' (ISP) may refer to the entity that provides the Internet service for the owner. 'Wireless service' or 'carrier service' may refer to the service that the user uses for wireless access, such as WiMAX. 'Wireless service provider' (WSP) may refer to the entity that provides the wireless service for the user or owner. While this nomenclature is used for simplicity, it does not represent the entire scope of all possible embodiments. For example, an owner may also be a user and the ISP may also be the WSP. As another example, the ISP may not be directly providing the owner with Internet access (e.g., the ISP may provide a building with Internet access, the building owner may then provide the fBS owner with Internet access).

In the embodiment depicted in FIG. 1, network 110a includes fBSs 190. fBSs 190 may, in essence, be small base stations purchased (or leased) by the owner from the WSP. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

In some situations, communication from one fBS 190 (such as fBS 190*a*) may be susceptible to interference caused by communication by another fBS 190 (such as fBS 190*b*). As described further below, fBSs 190 may be configured to analyze the network and determine one or more channels to communicate on that are not as susceptible to interference.

The fBS is envisioned as being installed at the owner premise by the owner with little or no support from the WSP. This is different than other types of small base station entities, which are typically installed and commissioned by the WSP. Since fBSs are operated in a home or office environment, it may be natural to consider fBSs 190 as private equipment accessible only by the owners' endpoints 140. However, in certain situations the owner of an fBS may provide wireless service to endpoints 140 of non-owners. Such fBSs may be referred to as public accessible fBSs.

Because the owner may purchase the fBS from a WSP and install it in their home, or virtually at any location with a broadband connection, the WSP may have little or no control over the location of fBSs 190. Accordingly, the WSP may attempt to determine the location of fBS 190 as part of an fBS initialization and operation procedure. There may be at least two considerations that a WSP may have with respect to the location of the fBS:

1.) The fBS may only be authorized to operate in a geographic area where the WSP has a license to use the RF spectrum. Accordingly, the operator may need to know the location of the fBS with an accuracy of 10 kilometers to meet the spectrum license related location requirement.

2.) The WSP may need to know the position of an fBS, within 100 meters, in order to provide location-based services (e.g., E911) and to optimize the wireless operation of its wireless networks through radio resource management (e.g., assigning proper carrier/segment/subchannels and fBS transmission power based on interference coming from the other fBSs in the same neighborhood) to ensure quality of service levels.

Fixed-mobile convergence (FMC) is the scenario where users can enjoy service continuity and service integration when they roam between outdoor and indoor environments. fBSs 190 may facilitate FMC by allowing endpoints 140 to use a single wireless interface. More specifically, once fBS 190*b*, for example, is installed in the owner's home he is able to use the same mobile device with the same wireless interface to connect to either mBS 120 outside or fBS 190*b* inside. The selection of which device to connect to can be made manually by the user or autonomously by endpoint 140*k*, BS 120, or any component coupled to or controlled by WSN network 110*e*.

Part of the installation process for the fBS may include providing it with Internet access for its backhaul connection. In the scenario depicted in FIG. 1, fBSs 190 are connected to network access devices 180. This connection may provide fBSs 190 with their backhaul connection to the WSP's network, WSN network 110*e*. Network access device 180 may provide the owner with general Internet access. fBSs 190 do not use dedicated back-haul communication lines associated with the WSP, but rather use the owner's existing Internet access. Depending on the embodiment and scenario the ISP and the WSP may be the same entity.

While fBSs 190 may use the owner's existing Internet access, similar to a traditional (e.g., WiFi) local area network wireless access point, as a user leaves the fBS's coverage area they may be handed-off to RS 130 or mBS 120. The hand-off may be possible because the user's endpoint is able to use the same wireless interface with RS 130 or mBS 120 that it uses with fBS 190. Furthermore, unlike a traditional WiFi wireless access point, operated in a license-exempt band, the fBS may typically be operated in a licensed band.

Within a network using a wireless protocol (e.g., 802.16j, or 802.16m), such as network 110*a*, particular embodiments may allow for fBSs 190 to be public or private. A public fBS may allow any of endpoints 140 to connect thereto; a private fBS may only allow connections from those endpoints 140 who are authorized to connect thereto. For example, fBS 190*a* may be a private fBS that the owner has installed in his home. The owner of fBS 190*a* may have authorized endpoints 140*h* and 140*i* (which may, for example be his phone (e.g., a mobile phone) and his laptop computer) to connect to fBS 190*a*. Accordingly, only these two endpoints may connect to fBS 190*a*. On the other hand, fBS 190*b* may be a public fBS, installed at a business. Accordingly, any of endpoints 140 within the coverage area of fBS 190*b* may connect thereto.

Each of endpoints 140 is connected to one of mBS 120, RSs 130, or fBSs 190. For simplicity, the component to which an endpoint is connected may be referred to as an access station. For example, the access station for endpoint 140*e* is fBS 190*a*. Between each endpoint 140 and its respective access station there may be a wireless connection 150, sometimes referred to as an access link. These wireless connections may be referred to as access links because they provide the endpoint with access to a network. Similarly, between each RS and mBS (or between two RSs) there may be a wireless connection 150, sometimes referred to as a relay link. This wireless connection may be referred to as a relay link because it relays communications between the access links and the mBS.

A wireless connection may comprise various wireless resources such as, for example, a combination of a particular center frequency, a particular bandwidth, a particular time slot, and/or a particular subchannel or group of subchannels (for example, as described in a downlink or uplink map). In particular embodiments, it may be convenient to discuss the resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

An increase in the number of wireless connections 150 within a given area may increase the impact and severity of interference between wireless connections 150. This may cause a decrease in quality of service (QoS) and an increase in maintenance costs. This may be of particular concern with respect to a large rollout of fBSs 190. More specifically, because the owner installs the fBS, there is no way for the WSP to perform any prior frequency planning and/or site surveillance. Accordingly, it may be desirable to know where a particular fBS has been configured. In particular embodiments, uplink sounding may be used to estimate the channel gain and interference strength between mBS 150, and multiple RSs 130 and fBSs 190. The uplink sounding may, therefore, be used in determining the quality and/or efficiency of the various wireless connections. This information may be used to facilitate in allowing the fBS to operate with little or no local intervention.

In particular embodiments, endpoints 140 may select which access station (e.g., one of mBS 120, RSs 130, or fBSs 190) to connect to based on, and in order to increase, at least in part, the spectrum efficiency of an access link for the respective access station. The spectrum efficiency may be determined using the Modulation and Coding Scheme (MCS) level which may be determined by the Carrier to Interference-plus-Noise Ratio (CINR) of the wireless connection and may be measured in units of bits/Hz/sec. For example, a Quadrature Phase-Shift Keying (QPSK) modulated signal with code rate ½, may have a spectrum efficiency of 1 bit/Hz/second.

Although the example communication system 100 of FIG. 1 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired network.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b is a PSTN (e.g., a voice based network); network 110c is a LAN; network 110d is a WAN (e.g., a long range optical network or the Internet); network 110e is a wireless service network (WSN) which may be operated by the WSP responsible for providing network 110a with wireless service (e.g., WiMAX); and network 110f is an Internet service network (ISN) which may be operated by the ISP responsible for providing its users with Internet access. Though not depicted in FIG. 1, both WSN network 110e and ISN network 110f may include servers, modems, gateways and any other components that may be needed to provide their respective service.

While networks 110 have been depicted as six separate networks, depending on the scenario any two, or more, of the networks may be a single network. For example, the WSP and the ISP may be the same business entity which may maintain the necessary components for both services on the same network thus merging ISN network 110f and WSN network 110e into a single network. Furthermore, the interconnections between networks 110 may vary from those depicted in FIG. 1. For example, if an owner uses Digital Subscriber Line (DSL) for his internet access, his fBS may connect through PSTN 110b.

Generally, networks 110a, and 110c-110f provide for the communication of packets, cells, frames, or other portions of information (generally referred to as packets herein) between endpoints 140 and/or nodes 170 (described below). In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e and/or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX mBS, along with one or more RSs and fBSs, in certain cases, may allow network 110a to cover the larger geographic area associated with a MAN while using a relatively small number of wired links. More specifically, by properly arranging mBS 120, multiple RSs 130 and fBSs 190 around a metropolitan area, the multiple access stations may use wireless connections 150 or existing wired links to communicate with mBS 120, and wireless connection 150 to communicate with wireless endpoints 140 throughout the metropolitan area. mBS 120 may, through wired connection 160a, communicate with other mBSs, any components of network 110e, any network components not capable of establishing a wireless connection, and/or other networks outside of the MAN, such as network 110d or the Internet.

As mentioned above, the coverage quality of network 110a may be enhanced through the use of fBSs 190. More specifically, the relatively reduced range of a WiMAX fBS may allow network 10a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's Internet access, provided by the owner's ISP via the ISP's network (e.g., network 110f), for its backhaul connection to the WSP's network (e.g., network 110e).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another mBS that is wired to mBS 120 via link 160j and to network 110d via link 160a. As a mBS, node 170a may be able to establish several wireless connections of its own with various other mBSs, RSs, and/or endpoints. As another example, node 170e may comprise a gateway. As a gateway node 170e may allow network 110b, a PSTN network, to be able to transmit and receive communications from other non-PSTN networks, such as network 110*d*, an IP network. More specifically, as a gateway, node 170*e* may translate communications between the various protocols used by networks 110*b* and 110*d*.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140*a*-140*k* may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
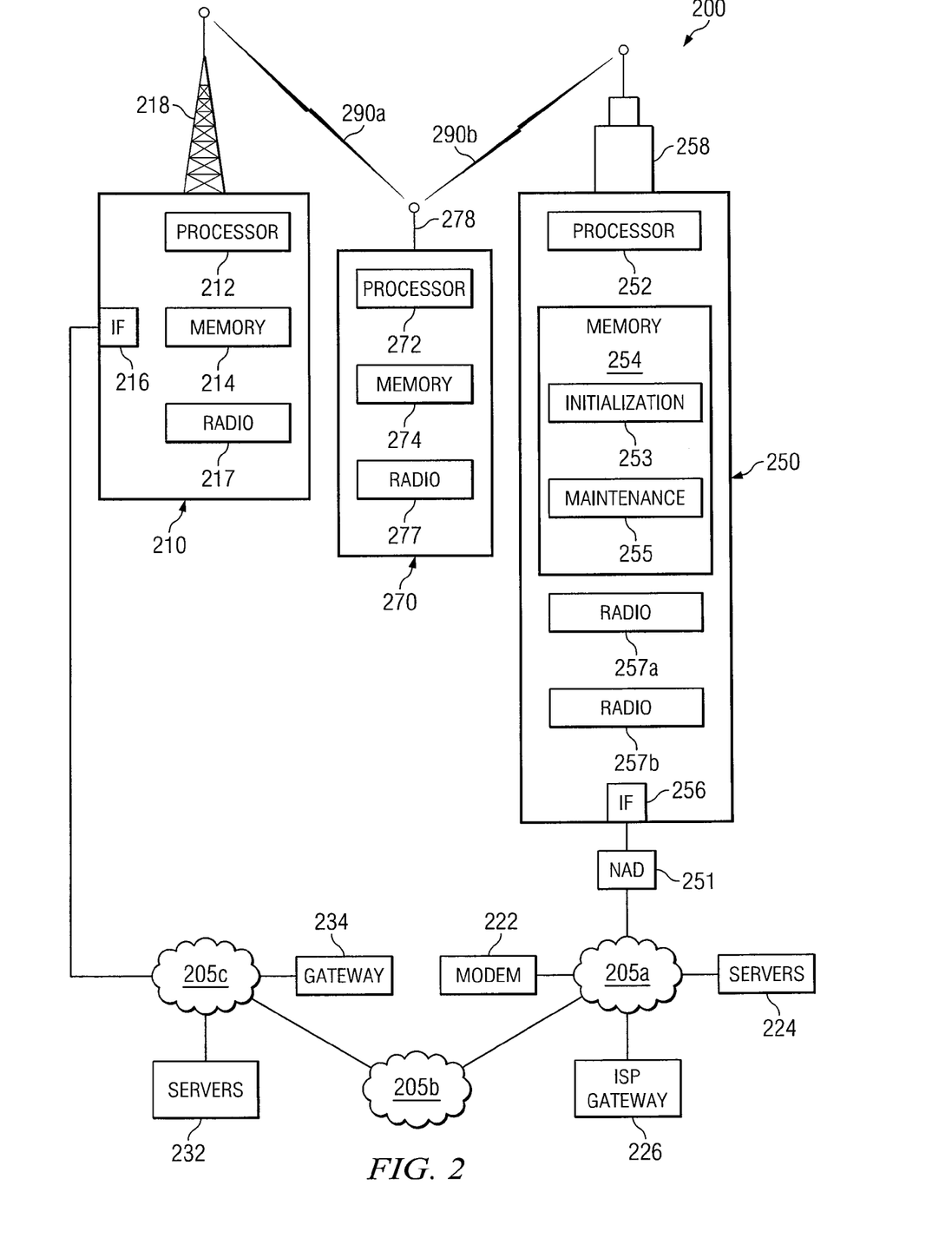
FIG. 2 illustrates one embodiment of a wireless network comprising an endpoint, a macro base station and a femto base station.

FIG. 2 illustrates a wireless network comprising a more detailed view of an endpoint, a mBS and a fBS, in accordance with a particular embodiment. More specifically, the depicted embodiment is a simplified scenario comprising networks 205, mBS 210, fBS 250 and endpoint 270. In different embodiments network 200 may comprise any number of wired or wireless networks, mBSs, endpoints, RSs, fBSs, and/or any other components that may facilitate or participate in the communication of data and/or signals whether via wired or wireless connections. mBS 210 and fBS 256 comprise processors 212 and 252, memory 214 and 254, communication interfaces 216 and 256, radios 217 and 257 and antennas 218 and 258. Similarly, endpoint 270 comprises processor 272, memory 274, radio 277, and antenna 278. These components may work together in order to provide wireless networking functionality, such as providing endpoints with wireless connections in a wireless network (e.g., a WiMAX wireless network).

Networks 205 may comprise separate but interconnected networks operated by one or more different operators. More specifically, network 205*a* may be the ISP's network, network 205*b* may be a public network (e.g., the Internet), and network 205*c* may be the WSP's network. The owner of fBS 250 may use network 205*a* for Internet access. In providing the owner with network access, the ISP's network 205*a* may include modems 222, servers 224, and ISP gateway 226. Modems 222 may be used by the ISP to communicate with the owner's network access device 251. Thus, network access device 251 and modems 222 may have complimentary hardware and/or software that may enable them to communicate data between one another. Network access device 251 may act as the owner's access point, similar to network access device 180 discussed above with respect to FIG. 1. Modems 222 may act as a gateway between the ISP's network 205*a* and the owner's network access device 251. In particular embodiments, modems 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205*a* with network 205*b*. For example, ISP gateway 226 may include switches, routers, firewalls, proxy servers, and other suitable equipment or software.

Network 205*c* may be a WiMAX service provider's network. Depending on the scenario, network 205*c* may be the user's or the owner's WiMAX service provider's network. In providing the WiMAX service, network 205*c* may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205*c* with network 205*b*.

Networks 205*a* and 205*c* may be coupled via network 205*b*. In some embodiments, network 205*b* may be the Internet. Thus, in such embodiments, fBS 250 may connect to the WSP's network, network 205*c*, via the Internet. Though network 205*b* is depicted as a single network, it may comprise any number of the networks described above with respect to FIG. 1. For example, network 205*b* may comprise the Internet, a LAN, WAN, MAN, PSTN or some combination of the above.

Processors 212, 252 and 272 may be microprocessors, controllers, or any other suitable computing devices, resources, or combinations of hardware, software and/or encoded logic operable to provide, either alone or in conjunction with other components, (e.g., memory 214, 254, and/or 274) wireless networking functionality. Such functionality may include providing various wireless features discussed herein. For example, processors 212, 252 and 272 may be able to determine the spectrum efficiency of one or more of wireless connections 290. Additional examples and functionality provided, at least in part, by processors 212, 252 and 272 will be discussed below.

Memory modules 214, 254, and 274 may be any form of volatile or non-volatile memory including, without limitation, magnetic media, optical media, random access memory (RAM), read-only memory (ROM), flash memory, removable media, or any other suitable local or remote memory component or components. Memory modules 214, 254, and 274 may store any suitable data, instructions, logic or information utilized by mBS 210, fBS 250, and endpoint 270, respectively, including software embedded in a computer readable medium, and/or encoded logic incorporated in hardware or otherwise stored (e.g., firmware). For example, in particular embodiments, memory modules 214, 254, and 274 may store information regarding the spectrum efficiency of one or more particular links. As another example, in the illustrated embodiment memory 254 contains initialization module 253 and maintenance module 255; these modules may be used to determine which channel(s) fBS 250 will use for communication, as described in further detail below. Modules 253 and 255, in some embodiments, may comprise instructions that may be executed by a processor, such as processor 252. Memory modules 214, 254, and 274 may also maintain a list, database, or other organization of data useful for determining how to route data to the proper component. For example, in some embodiments a tree structure (as opposed to a mesh structure) may be used in routing data from an endpoint to a mBS. More specifically, there may be a known path from mBS 210 to endpoint 270*b*. This path, or a portion thereof, may be stored in one or more of memory modules 214, 254, and 274. Additional examples of information stored by memory modules 214, 254, and 274 will be discussed below.

Radios 217, 257, and 277 may be coupled to or a part of antennas 218, 258, and 278, respectively. Radios 217, 257, and 277 may receive digital data that is to be sent out to other mBSs, fBSs, RSs and/or endpoints via a wireless connection. Radios 217, 257, and 277 may convert the digital data into a wireless signal having the appropriate center frequency and bandwidth parameters. These parameters may be predetermined, for example, by a combination of processor 212 and memory 214 of mBS 210. The radio signal may then be transmitted via antennas 218, 258, and 278 to the appropriate recipient. Similarly, radios 217, 257, and 277 may convert wireless signals received via antennas 218, 258, and 278, respectively, into digital data to be processed by processors 212, 252, or 272, as appropriate. Although a particular number of radios are shown, any suitable number of radios may be implemented per device.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216 and 256 may be used for the wired communication of signaling and/or data between mBS 210 and networks 205, and between fBS 250 and networks 205. For example, communication interface 216 may perform any formatting or translating that may be needed to allow mBS 210 to send and receive data from network 205*c* over a wired connection. As another example, communication interface 256 may comprise an interface (e.g., RJ-45) that is compatible with a corresponding interface on network access device 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via network access device 251, to provide the backhaul connection to network 205*c*, as opposed to the WiMAX service provider supplying the backhaul connection as is the case with mBS 210.

Network access device 251 may be used to provide the owner with Internet access. fBS 250 may utilize the Internet access for its backhaul connection to WiMAX network 205*c*. Depending on the type of network service and/or the user's service provider, network access device 251 may be a cable modem, a digital subscriber line (DSL) modem, a fiber optic modem, or any other modem, gateway or network access device provided by the owner's network service provider. The owner may have any number of routers, switches and/or hubs between fBS 250 and network access device 251.

As part of establishing a backhaul connection, fBS 250 may communicate with network access device 251. Network access device 251, which may be provided or authorized by the user's ISP, may provide fBS 250 with access to the ISP's network 205*a* which may then allow access to network 205*c*, via network 205*b*. Accessing network 205*a* may involve modem 241 communicating with the ISP's modems 222.

The ISP may operate one or more servers 224 (e.g., OAM&P, AAA, DHCP servers) in providing the user with Internet access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205*a* with the Internet (e.g., network 205*b*). This may allow fBS 250 to access WiMAX network 205*c* via the Internet. In connecting network 205*a* with the Internet, gateway 226 may perform any necessary formatting and/or security functions.

WiMAX network 205*c* may have its own gateway 234 and servers 232. Similar to the servers and gateways of ISP network 205*a*, gateway 234 and servers 232 may ensure that the user has a valid WiMAX account and that network 205*c* is able to communicate with other networks, such as network 205*b*. Servers 232 may also contain information, data, instructions and/or logic that may be used to provision various features and functionality of fBS 250. For example, they may provide fBS 250 with channel information for its wireless connection 290*b* with endpoint 270.

Endpoints 270 may be any type of wireless endpoints able to send and receive data and/or signals to and from mBS 210 and/or fBS 250. Some possible types of endpoints 270 may include desktop computers, PDAs, cell phones, smart phones, laptops, and/or VoIP phones.

The following examples may help to illustrate how these components inter-work with one another to provide the functionality of particular embodiments. To begin wireless communications using fBS 250, fBS 250 may execute initialization module 253 utilizing processor 252 in order to determine a channel (or channels) that fBS 250 will use to communicate with WiMAX network 205*c*. In some embodiments, the available channels may lie within 3496 to 2670 MHz range and may be 50 Mhz wide. Initialization module 253 may cause radios 257*a* and 257*b* to scan for channels available for communication. In some embodiments, as described in further detail with respect to FIG. 3, radios 257*a* and 257*b* may be directed to simultaneously scan for different channels providing the ability to scan the available channels faster. Radios 257 may provide channel quality metrics of the scanned channels, such as signal strength, noise strength, link quality, and any other suitable indications of the ability of the channel to communicate information. The results of the scan may be stored in memory 254.

Figure 3:
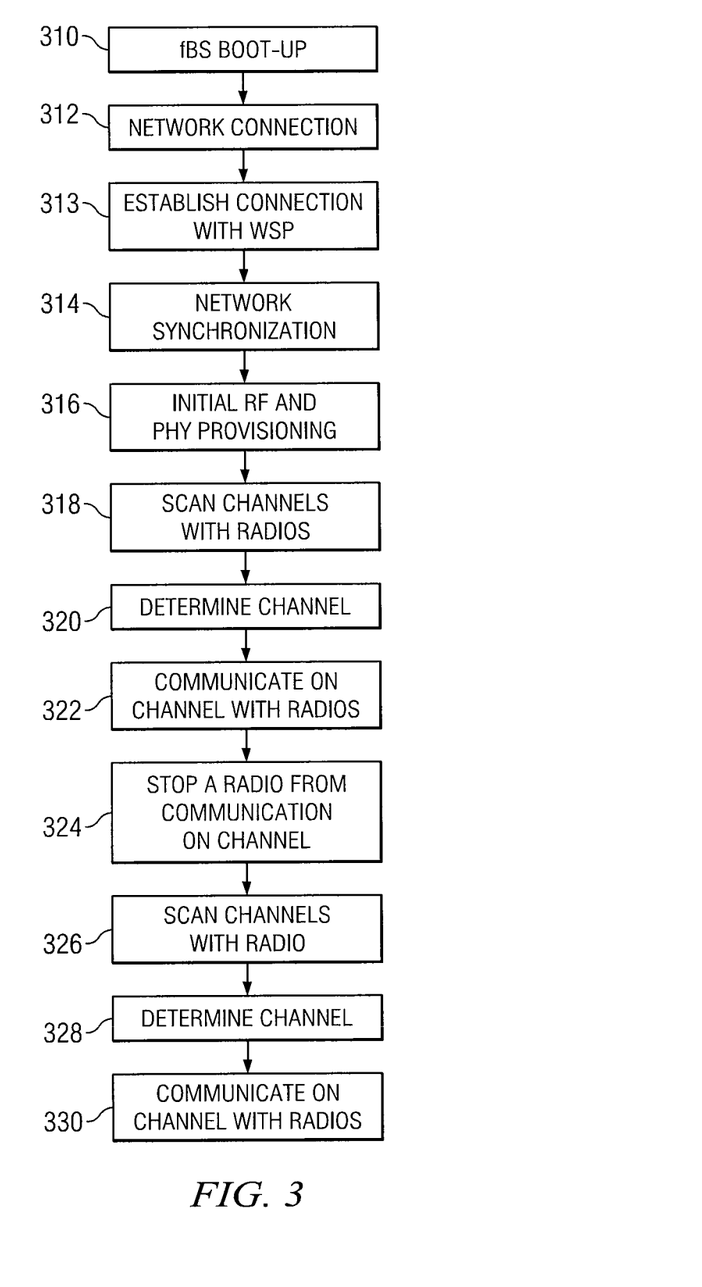
FIG. 3 is a flowchart illustrating one embodiment of the operation of a femto base station.

As discussed in further detail in conjunction with FIG. 3, processor 252 may select one or more channels over which to communicate on based on the channel quality metrics of the scanned channels. For example, processor 252 may select the channel(s) with the highest signal-to-noise ratio. Processor 252 may also select the channel(s) that meets at least one threshold, such as a signal-to-noise ratio threshold. Radios 257 may communicate on the selected channel(s) in a multiple-in-multiple-out (MIMO) mode.

During communication with WiMAX network 205c, fBS 250 may determine that the selected channel(s) are not performing well. fBS 250 may then execute maintenance module 255 utilizing processor 252 which may result in choosing at least one different channel with which fBS 250 will communicate with WiMAX network 205c. In some embodiments, maintenance module 255 is executed while fBS 250 is communicating on previously selected channel(s). The execution of maintenance module 255 may cause processor 252 may direct radio 257a to scan the available communication channels while radio 257b continues to communicate on the previously selected channel(s). In order to accomplish this, processor 252 may direct radios 257 to switch from communicating in a multiple-in-multiple-out (MIMO) mode to a single-in-single-out (SISO) mode.

While scanning the available channels, radio 257a may provide channel characteristics such as signal and noise levels. As described above, processor 252 may utilize these characteristics to determine at least one channel on which fBS 250 may communicate. This may include finding at least one channel that has the highest signal-to-noise ratio or utilizing at least one threshold (such as a signal-to-noise ratio threshold) to determine at least one channel that will be used by fBS 250 for communication. After selecting the at least one channel, processor 252 may direct radio 257b to stop communicating on the previously selected channel and for radios 257a and 257b to communicate on the newly selected channel. This may include directing radios 257 to switch to communicating in a MIMO mode.

Thus far several different embodiments and features have been presented. Particular embodiments may combine one or more of these features depending on operational needs and/or component limitations. This may allow for great adaptability of network 200 to the needs of various organizations and users.

FIG. 3 is a flowchart illustrating one embodiment of the operation of a femto base station (fBS), such as fBS 250. In general, the steps illustrated in FIG. 3 may be combined, modified, or deleted where appropriate, and additional steps may also be added to the example operation. Furthermore, the described steps may be performed in any suitable order.

Step 310 may begin once the fBS receives power and/or has otherwise been turned-on. During boot-up the fBS may execute a predetermined set of procedures that may load any software applications desired for operation. The applications that are loaded, and the order in which they are loaded, may vary depending on the particular implementation. The applications may be stored in a memory module, such as memory 254. Loading the applications may be accomplished by utilizing a processor, such as processor 252. Regardless of the order or specifics of the procedures implemented by the fBS during boot-up at step 310, once step 310 is complete the fBS may be functional such that any software applications that may be needed may be executed.

At step 312, the fBS attempts to connect to a public access network, such as ISN network 110f described above with respect to FIG. 1. This connection provides the fBS with its backhaul connection to the appropriate WSP's network. As discussed above, the backhaul connection may use the owner's own general use Internet access (e.g., the Internet access that the owner may use with his laptop to access the Internet) provided by an ISP. Depending on the embodiment, the public access network connection may be provided through xDSL, cable, or any other suitable and/or available network access means. In some embodiments, the fBS is connected to a leased or private access communication network.

Regardless of the type of network access that is used, the fBS or the network access device to which the fBS is connected may typically need to establish a connection (including, e.g., receiving an IP address) with the ISP's network in order to proceed. If the connection fails, the fBS device may raise a critical alarm. In certain embodiments, the fBS may make a predetermined number of attempts before raising the critical alarm and/or exiting the network entry procedure. The connection may fail for a variety of reasons. For example, the fBS may not be physically connected to the network access device, the network access device may not be physically connected to the ISP's network, the fBS may not be authorized with the network access device, the owner's account with the ISP may be not be valid, or any other of a number of reasons.

At step 313, the fBS may attempt to connect to the WSP's network. In particular embodiments, the fBS may be sold by a particular WSP that may pre-provision the fBS with various information. For example, the WSP may pre-provision the fBS with RF spectrum channels related to the WSP, an IP address of a security gateway for the WSP, an IP address of a related AAA server for the WSP, and any needed security parameters required to access the WSP's network. The fBS may use all, some or none of this information in attempting to connect to the WSP's network. As previously mentioned, the WSP may be the same or a different provider than the ISP. For example, a user may have WiMAX service from a first provider and Internet access from a second provider. As another example, a user may have WiMAX service and Internet access from the same provider.

If the fBS is unable to connect to the WSP's network, for any reason (e.g., any of the reasons provided above with respect to connecting to the ISP's network), a critical alarm may be raised. As before, the fBS may make a predetermined number of attempts to connect to the WSP's network before it raises the critical alarm and/or exits the network entry procedure.

At step 313, both the fBS's owner and the fBS itself may also be authenticated. The authentication may, for example, be done to verify that the owner's account is in good standing and that fBS is an authorized fBS. If the fBS is attempting to authenticate with a foreign WSP's network, the foreign WSP may also verify that the SLA credentials of the owner's WSP are still in good standing. If the owner or the fBS is not authenticated then the fBS may raise a critical alarm and exit the network entry procedure. In certain embodiments, the fBS may make a predetermined number of attempts before raising the critical alarm and/or exiting the network entry procedure.

In particular embodiments, during authentication the owner's WSP or the foreign WSP, as the case may be, may send the fBS certain RF and PHY parameters. These parameters may be used by the fBS to start its initial operations. The RF channel parameters may help the fBS to narrow the range of its RF scan to only the allocated RF spectrum (e.g., 30 MHz) rather than the entire frequency band (e.g., 200 MHz). Reducing the RF spectrum to be scanned may speed up the RF scanning process. In certain embodiments, the fBS may also receive initial RF power parameters. This may effect the range of the fBS and thus its impact on any neighboring access stations. Depending on the embodiment, the PHY parameters may include one or more of the Fast Fourier Transform (FFT) size, the downlink/uplink subframe ratio, segmentation, or the pseudo noise (PN) sequence.

At step 314, the fBS begins network synchronization with the WSP's (either the owner's WSP or the foreign WSP) wireless network. This may include the fBS becoming synchronized in time with the WSP's master WiMAX network.

Network synchronization may be achieved using any of a variety of techniques. For example, if the fBS is equipped with a GPS device, and the GPS device is able to receive a satellite signal, then the timing signal within the GPS signal may be used for synchronization. As another example, the fBS may synchronize over the public access network it is using for its backhaul connection using, for example, IEEE 1588.

If the fBS is not able to synchronize or no network synchronization is detected, then the fBS may raise a critical alarm and exit the network entry procedure. In certain embodiments, the fBS may make a predetermined number of attempts before raising the critical alarm and/or exiting the network entry procedure.

At step 316 the initial RF and PHY provisioning is performed. The provisioning may be based on the RF and PHY parameters that the fBS may have previously received during authentication. The provisioning may be done while considering the spectrum coverage provided at the respective location. For example, if the fBS is in a foreign location (e.g., a location covered by a foreign WSP) then the basic RF and PHY parameters may be provided by the foreign WSP.

At step 318, the fBS may scan the available RF channels. In some embodiments, the available channels may lie within 3496 to 2670 MHz range and may be 50 Mhz wide. The available RF channels may be received by the fBS during network synchronization (at step 314) or during a provisioning phase (such as at step 316). In particular embodiments, multiple radios may be used to scan the available channels, such as radios 257a and 257b. The fBS may be configured to direct each radio to scan a different set of channels. This may result in a faster scanning process. Channel quality metrics is derived by the radios during the scan. Channel quality metrics of the scanned channels may include signal strength, noise strength, link quality, and any other suitable indications of the ability of the channel to communicate information.

At step 320, the fBS may determine a channel from the available RF channels on which to communicate. This may occur by utilizing a program stored in the fBS. For example, the fBS may execute a software module (such as initialization module 253) using a processor (such as processor 252). In some embodiments, the fBS may choose more than one channel on which to communicate. The fBS may utilize the information about the channel determined at step 318 to choose the channel(s) it will communicate on. For example, the fBS may determine a metric such as a signal-to-noise ratio for each scanned channel. The fBS may determine a channel(s) to communicate on based on the determined metrics; for example, the fBS may choose a channel(s) with the highest signal-to-noise ratios. In some embodiments, the fBS may use thresholds to determine a channel(s) on which to communicate. For example, the fBS may select a channel(s) to communicate on if they meet a particular signal-to-noise level ratio.

In some embodiments, step 320 may be performed before step 318 may be completed. The fBS may be configured to analyze each channel after it has been scanned rather than waiting for all the channels to be scanned before performing the analysis. This may lead to a faster determination of which channel(s) should be used for communication. For example, the scanning process may begin as described at step 318. As the radios determine information about each channel, the fBS may compute the signal-to-noise ratio (SNR) for each channel and keep track of the signal-to-noise ratio of the channel(s) such that, after the scan is complete, the fBS may compare the tracked signal-to-noise ratios to the SNR of the most recently scanned channel(s).

In another example operation, the fBS may determine a channel(s) to communicate on before the scan of all the channels is complete. The fBS may use thresholds to determine the channel(s) it will use to communicate. As described above, the fBS may determine signal-to-noise ratios of scanned channels as the channels are being scanned. If a certain channel(s) meet the threshold, in particular embodiments, the fBS may choose to communicate on the channel(s) and forego completing the scanning process.

At step 322, the fBS may communicate with an endpoint using the determined channel(s) from step 320. In some embodiments, the fBS may use multiple radios (such as radios 257) to communicate with the endpoint. The fBS uses the multiple radios in a MIMO communication mode. Alternatively, each radio may be used in a SISO mode to communicate with the endpoint.

While communicating with the endpoint, the fBS may determine that there has been a decrease in the performance of the determined channel(s). As a result, the fBS may execute a maintenance module, such as maintenance module 255. At step 324, the fBS may direct one of the multiple radios to stop communicating with the endpoint. In some embodiments, this may require that the fBS switch from a MIMO mode to a SISO mode of communication utilizing another radio. At step 326, the fBS may direct the radio not communicating with the endpoint to scan the available channels. The radio may then scan the available channels and determine channel quality metrics, such as signal and noise levels. At step 328, the fBS may determine a channel on which to communicate. This may occur in a fashion similar to step 320. For example, the fBS may determine which channel(s) have the best signal-to-noise ratios and select those. Or, the fBS may select channel(s) according to signal-to-noise ratio thresholds.

As described above with respect to steps 318 and 320, step 328 may be performed before step 326 is completed. In addition, as described above, fBS may determine the channel(s) it will use to communicate before the scan process is completed. For example, the fBS may determine that a channel (or channels) has met a signal-to-noise threshold and will utilize that channel even though other channels have not been scanned. As a result, the fBS may terminate the scan process and proceed by utilizing the chosen channel(s).

At step 330, the fBS may utilize the channel(s) determined at step 328 to communicate with the WSP. In some embodiments, this may include directing the radio which had been communicating with the WSP to switch to the channel(s) determined at step 328. The fBS may utilize more than one radio to communicate on the determined channel(s). For example, the fBS may direct that the radios operate in a MIMO mode. In some embodiments, this may provide an advantage in that the fBS may be able to dynamically switch communication channels and increase the performance of the communication session with the WSP.

Although several embodiments have been illustrated and described in detail, it will be recognized that modifications and substitutions are possible without departing from the spirit and scope of the appended claims.

What is claimed is:

1. A method for wireless communication, comprising:
   establishing a communication session with a network access device, the network access device providing access to a wired communication network;
   receiving information for provisioning a plurality of wireless channels of a wireless communication network from the wired communication network, the information including a parameter for narrowing a frequency range of a scan of the plurality of wireless channels to a range allocated from among an entire frequency band;
based on the received information, performing a first scan of the plurality of wireless channels utilizing at least two radios of a base station simultaneously;
determining a channel quality metric for at least two of the wireless channels in response to the first scan;
selecting a first wireless channel of the plurality of wireless channels in response to determining the channel quality metrics; and
communicating on the first wireless channel utilizing the at least two radios of the base station.

2. The method of claim 1, wherein communicating on the first wireless channel utilizing the at least two radios comprises communicating with a mobile station.

3. The method of claim 2, wherein communicating on the first wireless channel utilizing the at least two radios comprises communicating in a multiple-in-multiple-out mode.

4. The method of claim 1, further comprising:
stopping a first radio of the at least two radios from communicating on the first wireless channel;
performing a second scan of the plurality of wireless channels utilizing the first radio;
determining a channel quality metric for at least one of the wireless channels in response to the second scan;
selecting a second wireless channel in response to determining the channel quality metric for the at least one wireless channel; and
communicating on the second wireless channel utilizing the at least two radios.

5. The method of claim 1, wherein the wireless communication network comprises a WiMax network.

6. The method of claim 1, wherein selecting the first wireless channel further comprises comparing the channel quality metrics to a threshold, the threshold comprising a noise metric.

7. The method of claim 1, wherein selecting the first wireless channel further comprises comparing the determined channel quality metrics to each other.

8. A method for wireless communication, comprising:
establishing a communication session with a network access device, the network access device providing access to a wired communication network;
receiving information for provisioning a plurality of wireless channels of a wireless communication network from the wired communication network, the information including a parameter for narrowing a frequency range of a scan of the plurality of wireless channels to a range allocated from among an entire frequency band;
communicating on a first wireless channel of the plurality of wireless channels utilizing at least two radios of a base station;
stopping a first radio of the at least two radios from communicating on the first wireless channel;
based on the received information, performing a first scan of the plurality of wireless channels utilizing the first radio;
determining a channel quality metric for at least one wireless channel of the plurality of wireless channels in response to the first scan;
selecting a second wireless channel of the plurality of wireless channels in response to determining the channel quality metric; and
communicating on the second wireless channel utilizing the at least two radios of the base station.

9. The method of claim 8, wherein communicating on the second wireless channel utilizing the at least two radios comprises communicating with a mobile station.

10. The method of claim 9, wherein communicating on the second wireless channel utilizing the at least two radios comprises communicating in a multiple-in-multiple-out mode.

11. The method of claim 8, further comprising:
performing a second scan of the plurality of wireless channels utilizing the at least two radios of the base station simultaneously;
determining a channel quality metric for at least two of the wireless channels in response to the second scan; and
selecting the first wireless channel in response to determining the channel quality metrics.

12. The method of claim 8, wherein the wireless communication network comprises a WiMax network.

13. The method of claim 8, wherein selecting the second wireless channel comprises comparing the channel quality metrics to a threshold, the threshold comprising a noise metric.

14. The method of claim 8, wherein selecting the second wireless channel comprises comparing the channel quality metrics to each other.

15. A system for wireless communication, comprising:
an interface operable to:
establish a communication session with a network access device, the network access device providing access to a wired communication network;
receive information for provisioning a plurality of wireless channels of a wireless communication network from the wired communication network, the information including a parameter for narrowing a frequency range of a scan of the plurality of wireless channels to a range allocated from among an entire frequency band;
at least two radios operable to:
based on the received information, perform a first scan of the plurality of wireless channels simultaneously;
determine a channel quality metric for at least two of the wireless channels in response to the first scan; and
a processor operable to:
select a first wireless channel of the plurality of wireless channels in response to determining the channel quality metrics; and
direct the at least two radios to communicate on the first wireless channel.

16. The system of claim 15, wherein the at least two radios are further operable to communicate on the first wireless channel with a mobile station.

17. The system of claim 16, wherein the at least two radios are further operable to communicate on the first wireless channel in a multiple-in-multiple-out mode.

18. The system of claim 15, wherein:
the at least two radios are further operable to:
stop a first radio of the at least two radios from communicating on the first wireless channel;
perform a second scan of the plurality of wireless channels utilizing the first radio;
determine a channel quality metric for at least one of the wireless channels in response to the second scan; and
the processor is further operable to:
select a second wireless channel of the plurality of wireless channels in response to determining the channel quality metric for the at least one wireless channel; and
direct the at least two radios to communicate on the second wireless channel.

19. The system of claim 15, wherein the wireless communication network comprises a WiMax network.

20. The system of claim 15, wherein the processor is further operable to compare the channel quality metrics to a threshold, the threshold comprising a noise metric.

21. The system of claim 15, wherein the processor is further operable to compare the channel quality metrics to each other.

22. A system for wireless communication, comprising:
an interface operable to:
  establish a communication session with a network access device, the network access device providing access to a wired communication network;
  receive information for provisioning a plurality of wireless channels of a wireless communication network from the wired communication network, the information including a parameter for narrowing a frequency range of a scan of the plurality of wireless channels to a range allocated from among an entire frequency band;
at least two radios operable to:
  stop a first radio of the at least two radios from communicating on a first wireless channel of the plurality of wireless channels;
  based on the received information, perform a first scan of the plurality of wireless channels utilizing the first radio;
  determine a channel quality metric for at least one of the wireless channels in response to the first scan; and
a processor operable to:
  select a second wireless channel of the plurality of wireless channels in response to determining the channel quality metric for the at least one wireless channel; and
  direct the at least two radios to communicate on the second wireless channel.

23. The system of claim 22, wherein the at least two radios are further operable to communicate on the second wireless channel with a mobile station.

24. The system of claim 23, wherein the at least two radios are further operable to communicate on the second wireless channel in a multiple-in-multiple-out mode.

25. The system of claim 22, wherein:
the at least two radios are further operable to:
  perform a second scan of the plurality of wireless channels;
  determine a channel quality metric for at least two wireless channels of the plurality of wireless channels in response to the second scan; and
the processor is further operable to:
  select the first wireless channel of the plurality of wireless channels in response to determining the channel quality metrics; and
  direct the at least two radios to communicate on the first wireless channel.

26. The system of claim 22, wherein the wireless communication network comprises a WiMax network.

27. The system of claim 22, wherein the processor is further operable to compare the channel quality metrics to a threshold, the threshold comprising a noise metric.

28. The system of claim 22, wherein the processor is further operable to compare the channel quality metrics to each other.

* * * * *